United States Patent
He (10) Patent No.: US 11,967,289 B2
(45) Date of Patent: Apr. 23, 2024

(54) METHOD FOR DETECTING LIGHT LEAKAGE OF SCREEN, METHOD FOR DETECTING AMBIENT LIGHT, AND APPARATUS FOR DETECTING AMBIENT LIGHT

(71) Applicant: SHENZHEN GOODIX TECHNOLOGY CO., LTD., Shenzhen (CN)

(72) Inventor: Chao He, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 0 days.

(21) Appl. No.: 18/064,356

(22) Filed: Dec. 12, 2022

(65) Prior Publication Data
US 2023/0360610 A1 Nov. 9, 2023

(30) Foreign Application Priority Data

May 9, 2022 (CN) .......................... 202210498668.8

(51) Int. Cl.
*G09G 3/34* (2006.01)
*G01J 1/42* (2006.01)

(52) U.S. Cl.
CPC .......... *G09G 3/3406* (2013.01); *G01J 1/4204* (2013.01); *G09G 2320/0626* (2013.01); *G09G 2360/144* (2013.01)

(58) Field of Classification Search
CPC ......... G02F 1/133512; G02F 1/134336; G02F 1/134345; G02F 1/13624
See application file for complete search history.

(56) References Cited

U.S. PATENT DOCUMENTS

2008/0225218 A1\* 9/2008 Lee .................. G02F 1/134336
349/144
2019/0129257 A1\* 5/2019 Wang ................ G02F 1/134309

\* cited by examiner

*Primary Examiner* — Van N Chow
(74) *Attorney, Agent, or Firm* — Emerson, Thomson & Bennett, LLC; Roger D. Emerson; Peter R. Detorre (57) ABSTRACT

Embodiments of the present disclosure provide a method for detecting light leakage of a screen, a method for detecting ambient light, and an apparatus for detecting ambient light. The method for detecting light leakage of a screen includes: acquiring a brightness value of the screen and grayscale values of pixel points within a preset display region of the screen; clustering the pixel points based on a plurality of preset grayscale value intervals and the grayscale values of the pixel points, to obtain a plurality of pixel point sets; obtaining light leakage values corresponding to the pixel point sets based on the brightness value and fused grayscale values corresponding to the pixel point sets; and obtaining a light leakage value of the screen based on the light leakage values corresponding to the pixel point sets.

13 Claims, 4 Drawing Sheets

METHOD FOR DETECTING LIGHT LEAKAGE OF SCREEN, METHOD FOR DETECTING AMBIENT LIGHT, AND APPARATUS FOR DETECTING AMBIENT LIGHT

CROSS-REFERENCE TO RELATED APPLICATIONS

This application claims priority to the Chinese Patent Application No. 202210498668.8, filed on May 9, 2022 and entitled "METHOD FOR DETECTING LIGHT LEAKAGE OF SCREEN, METHOD FOR DETECTING AMBIENT LIGHT, APPARATUS FOR DETECTING LIGHT LEAKAGE OF SCREEN, APPARATUS FOR DETECTING AMBIENT LIGHT, AND ELECTRONIC DEVICE", the disclosures of which is hereby incorporated by reference in its entirety.

TECHNICAL FIELD

Embodiments of the present disclosure relate to the technical field of terminal detection, and in particular to, a method for detecting light leakage of a screen, a method for detecting ambient light, an apparatus for detecting light leakage of a screen, an apparatus for detecting ambient light, an electronic device, and a computer storage medium.

BACKGROUND

In order to meet the trend of large screens of electronic devices, e.g., a mobile phone, components such as an ambient light sensor (ALS) will be built in below a screen of an electronic device. The ALS is configured to detect an ambient light intensity. The electronic device may adjust brightness of a screen based on the ambient light intensity detected by the ALS, such that the brightness of the screen conforms to visual perception of human eyes. In addition, the electronic device may further adjust color temperatures based on the ambient light intensity detected by the ALS, to assist in display and photographing.

Since the ALS is provided below the screen, when detecting ambient light, the ALS is easily interfered by light leakage below the screen caused by light emitted by the screen itself. A real ambient light intensity can be obtained by subtracting a leakage light intensity from the ambient light intensity detected by the ALS. Therefore, the key to detect the ambient light intensity is how to detect the light intensity of the leakage light.

In related technologies, some technical solutions on computing of the light intensity of the leakage light are mentioned. However, in some practical application scenarios of the ALS, when these technical solutions are used to detect the light intensity of the leakage light of the screen, there may be the problems of long time consumption and high power consumption, thus failing to meet the requirements for application of the electronic device.

SUMMARY

In view of this, embodiments of the present disclosure provide a method for detecting light leakage of a screen, a method for detecting ambient light, an apparatus for detecting light leakage of a screen, an apparatus for detecting ambient light, an electronic device, and a computer storage medium, to at least partially solve the above problems.

According to a first aspect of the embodiments of the present disclosure, a method for detecting light leakage of a screen is provided, including: acquiring a brightness value of the screen and grayscale values of pixel points within a preset display region of the screen; clustering the pixel points based on a plurality of preset grayscale value intervals and the grayscale values of the pixel points, to obtain a plurality of pixel point sets, where grayscale values of pixel points in a same pixel point set are in a same grayscale value interval; obtaining light leakage values corresponding to the pixel point sets based on the brightness value and fused grayscale values corresponding to the pixel point sets, where each of the fused grayscale values is obtained by fusing the grayscale values of the pixel points in the pixel point set corresponding to the fused grayscale value; and obtaining a light leakage value of the screen based on the light leakage values corresponding to the pixel point sets.

In an alternative embodiment, the obtaining the light leakage value of the screen based on the light leakage values corresponding to the pixel point sets includes:
  acquiring light leakage weight values corresponding to the pixel point sets; and
  performing weighted summation on the light leakage weight values corresponding to the pixel point sets and the light leakage values corresponding to the pixel point sets, to obtain the light leakage value of the screen.

In an alternative embodiment, the acquiring the light leakage weight values corresponding to the pixel point sets includes:
  acquiring light leakage weight values corresponding to pixel points in the pixel point sets, where the light leakage weight values of the pixel points depend on relative positions between the pixel points and a light sensor provided below the screen; and
  fusing, for each of the pixel point sets, light leakage weight values corresponding to the pixel points in the pixel point set, to obtain the light leakage weight value corresponding to the pixel point set.

In an alternative embodiment, the acquiring the light leakage weight values corresponding to the pixel point sets includes:
  computing a light leakage weight value corresponding to each of the pixel point sets in accordance with the equation:

$$\text{weight} = \frac{\sum_{i=1}^{n} Wi}{N}$$

where weight is the light leakage weight value corresponding to the pixel point set, Wi is a light leakage weight value of a block where an i-th pixel point in the pixel point set is located, N is the number of pixel points included in each block, and n is the number of pixel points included in the pixel point set.

In an alternative embodiment, the obtaining the light leakage values corresponding to the pixel point sets based on the brightness value and the fused grayscale values corresponding to the pixel point sets includes:
  acquiring a preset corresponding relationship between the grayscale values, the brightness value, and the light leakage values; and
  obtaining, based on the corresponding relationship, the light leakage values corresponding to the pixel point sets according to the brightness value and the fused grayscale values corresponding to the pixel point sets.

In an alternative embodiment, the obtaining the light leakage values corresponding to the pixel point sets based on the brightness value and the fused grayscale values corresponding to the pixel point sets includes:

inputting the brightness value and the fused grayscale value corresponding to each of the pixel point sets into a neural network model, to process the brightness value and the fused grayscale value corresponding to the each of the pixel point sets using the neural network model, to obtain the light leakage value corresponding to each of the pixel point sets.

In an alternative embodiment, the neural network model includes a residual module, the residual module includes a plurality of fully connected units, the plurality of fully connected units is sequentially connected in series, a skip connection exists between the plurality of fully connected units, and the skip connection includes a connection between two non-adjacent fully connected units.

In an alternative embodiment, the skip connection is a skip connection between a first fully connected unit and a last fully connected unit among the plurality of fully connected units.

In an alternative embodiment, the number of the residual modules is plural, the neural network model further includes a first fully connected module and a second fully connected module, and the plurality of residual modules is cascade-connected and is located between the first fully connected module and the second fully connected module.

In an alternative embodiment, the preset display region is a light detection region of the screen, and the light detection region corresponds to a position of a light sensor provided below the screen.

In an alternative embodiment, the clustering the pixel points based on the plurality of preset grayscale value intervals and the grayscale values of the pixel points, to obtain the plurality of pixel point sets, includes:

acquiring a preset mapping relationship between the grayscale value intervals and the pixel point sets; and dividing the pixel points into the plurality of pixel point sets based on the preset mapping relationship and the grayscale values of the pixel points.

According to a second aspect of the embodiments of the present disclosure, a method for detecting ambient light is provided, including the method for detecting light leakage of a screen according to the first aspect: determining a light leakage value of the screen; acquiring a light sensitivity value detected by a light sensor provided below the screen; and determining an ambient light value based on the light sensitivity value and the light leakage value.

According to a third aspect of the embodiments of the present disclosure, an apparatus for detecting light leakage of a screen is provided, including:

an acquiring module configured to acquire a brightness value of the screen and grayscale values of pixel points within a preset display region of the screen;

a clustering module configured to cluster the pixel points based on a plurality of preset grayscale value intervals and the grayscale values of the pixel points, to obtain a plurality of pixel point sets, where pixel points with grayscale values in a same grayscale value interval are clustered into a same pixel point set;

a light leakage computing module configured to obtain light leakage values corresponding to the pixel point sets based on the brightness value and fused grayscale values corresponding to the pixel point sets, where each of the fused grayscale values is obtained by fusing the grayscale values of the pixel points in the pixel point set corresponding to the fused grayscale value; and a determining module configured to obtain a light leakage value of the screen based on the light leakage values corresponding to the pixel point sets.

According to a fourth aspect of the embodiments of the present disclosure, an apparatus for detecting ambient light is provided, including:

a screen light leakage detecting apparatus configured to determine a light leakage value of a screen, where the screen light leakage detecting apparatus is the apparatus for detecting light leakage of a screen according to the third aspect;

an acquiring module configured to acquire a light sensitivity value detected by a light sensor provided below the screen; and an ambient light computing module configured to determine a real ambient light value based on the light sensitivity value and the light leakage value.

According to a fifth aspect of the embodiments of the present disclosure, an electronic device is provided, including: at least one processor, a memory, a bus, and a communication interface, where the processor stores a program, the processor, the communication interface, and the memory complete communication with each other through the communication bus, the communication interface is configured to communicate with other devices or components, and the processor executes the program.

According to a sixth aspect of the embodiments of the present disclosure, a computer storage medium is provided, storing a computer program thereon, where the computer program, when executed by a processor, implements the method for detecting light leakage of a screen according to the first aspect, or the method for detecting ambient light according to the second aspect.

In the embodiments of the present disclosure, a brightness value of the screen and grayscale values of pixel points within a preset display region of the screen are acquired, the pixel points are clustered based on a plurality of preset grayscale value intervals, to obtain a plurality of pixel point sets, light leakage values corresponding to the pixel point sets are obtained based on the brightness value and fused grayscale values corresponding to the pixel point sets, and a light leakage value of the screen is obtained based on the light leakage values corresponding to the pixel point sets. Because grayscale values of pixel points in a same pixel point set are in the same grayscale value interval (i.e., pixel points with grayscale values in a same grayscale value interval are clustered into the same pixel point set), a light leakage value is computed once for each of the pixel point sets, thereby greatly reducing the total number of computations, and thus greatly reducing the power consumption and time costs when detecting the light leakage of the screen, and satisfying the requirements for application of the electronic device.

BRIEF DESCRIPTION OF THE DRAWINGS

To more clearly describe the technical solutions in embodiments of the present disclosure or the prior art, the accompany drawings to be used in the description of the embodiments or the prior art will be briefly introduced below. Apparently, the drawings in the description below are merely some embodiments disclosed in the embodiments of the present disclosure. For those of ordinary skills in the art, other drawings may also be obtained based on these drawings.

DETAILED DESCRIPTION OF EMBODIMENTS

To enable those skilled in the art to better understand the technical solutions in embodiments of the present disclosure, the technical solutions in the embodiments of the present disclosure will be clearly and completely described below with reference to the accompanying drawings in the embodiments of the present disclosure. Apparently, the described embodiments are merely a part, instead of all, of the embodiments of the present disclosure. All other embodiments obtained by those of ordinary skills in the art based on some embodiments among the embodiments of the present disclosure shall be encompassed within the scope of protection of the embodiments of the present disclosure.

Specific implementations of the embodiments of the present disclosure will be further described below with reference to the drawings in the embodiments of the present disclosure.

Figure 1:
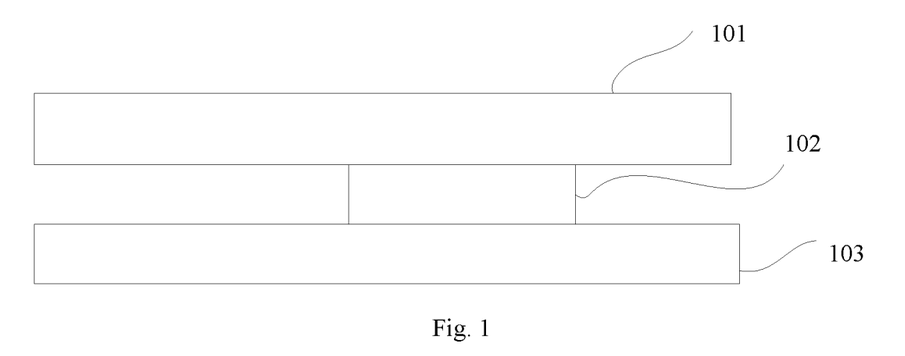
FIG. 1 is a schematic structural diagram of an electronic device provided in an embodiment of the present disclosure.

The method for detecting light leakage of a screen provided in the embodiments of the present disclosure is adapted to an electronic device with a light sensor provided below a screen thereof. Referring to FIG. 1, in order to meet the trend of large screens of electronic devices, e.g., a mobile phone, and in order to maintain the integration of simple appearance and industrial design, a light sensor 102 is installed below a screen 101 of an electronic device, and more specifically, installed below a light detection region on the screen 101 for detecting an ambient light intensity. In an implementation, the light sensor 102 may output a light sensitivity value of five sensing channels (RGBCW). The ambient light intensity may be obtained by converting the light sensitivity value of the five channels through a specific algorithm.

A main board of the electronic device is provided with a processor, which may adjust brightness of the screen 101 based on the ambient light intensity detected by the light sensor 102, such that the brightness of the screen 101 conforms to visual perception of human eyes. The processor may further adjust color temperatures based on the ambient light intensity detected by the light sensor 102, to assist in display and photographing.

However, as a commonly used screen for electronic devices, a liquid crystal display screen and an organic light-emitting diode (OLED) have light leakage of the screen. The light leakage of the screen means that light emitted by the screen itself will be emitted from the back of the screen 101. The back of the screen 101 is opposite to the front of the screen 101. The front of the screen 101 refers to a side that is directly observable. Since the light sensor 102 is provided below the screen 101, the light sensor 102 is easily interfered by the light leakage of the screen when detecting ambient light. That is, the light intensity detected by the light sensor 102 includes not only the real ambient light intensity, but also the light intensity of the leakage light of the screen, such that the real ambient light intensity can be obtained only by subtracting the light intensity of the leakage light of the screen from the light intensity detected by the light sensor 102.

Therefore, the key for the light sensor 102 to correctly detect the ambient light intensity is how to accurately compute the light intensity of the leakage light of the screen. The light leakage of the screen is associated with many factors. The inventor sought factors associated with the light leakage of the screen by analysis on a large amount of experimental data, and finally found that the light leakage of the screen is associated with a plurality of screen display parameters, such as grayscale values of pixel points in the screen 101, a brightness value of the screen 101, a refresh rate of the screen 101, and a display mode of the screen 101, and there is a stable relationship between the light leakage of the screen and these screen display parameters. In related technologies, it is mentioned that at least a part of a display content in the screen is captured, and a light leakage value of the screen is detected using a relationship between grayscale values of pixel points within a screenshot region and the light leakage of the screen. When the display content in the screen is a solid color image, each pixel point in the screenshot region has the same grayscale value, and only less computation is required to obtain the light leakage value of the screen. However, in an actual application scenario of the light sensor, the screen 101 of the electronic device may display a playing image or video. In this case, it is necessary to traverse each pixel point in the whole screenshot region, separately compute a light leakage value for each pixel point, and then perform weighted summation on the light leakage value corresponding to each pixel point and a weighting coefficient corresponding to each pixel point, to obtain the light leakage value of the screen. When light leakage of a single pixel point is computed, weight of the single pixel point does not necessarily reach an equivalent accuracy, such that this light leakage detection approach has the problem of very fine computation granularity. In addition, when computing light leakage using this light leakage detection approach, the electronic device will have the problem of very long time consumption and very high power consumption, and can hardly meet the requirements for application of the electronic device.

Therefore, the embodiment of the present disclosure provides a method for detecting light leakage of a screen, including acquiring a brightness value of the screen and grayscale values of pixel points within a preset display region of the screen, clustering the pixel points based on a plurality of preset grayscale value intervals and the grayscale values of the pixel points, to obtain a plurality of pixel point sets, obtaining light leakage values corresponding to the pixel point sets based on the brightness value and fused grayscale values corresponding to the pixel point sets, and then obtaining a light leakage value of the screen based on the light leakage values corresponding to the pixel point sets. In the present solution, because grayscale values of pixel points in a same pixel point set are in the same grayscale value interval (i.e., pixel points with grayscale values in a same grayscale value interval are clustered into the same pixel point set), the light leakage value computation is executed once for each pixel point set, thereby greatly reducing the number of computations, and thus greatly reducing the power consumption and time costs when detecting the light leakage of the screen by the electronic device, and satisfying the requirements for application of the electronic device, compared with related technologies by which the light leakage value computation is executed once for each pixel point.

Specific implementations of the embodiments of the present disclosure will be further described below with reference to the drawings in the embodiments of the present disclosure.

Figure 2:
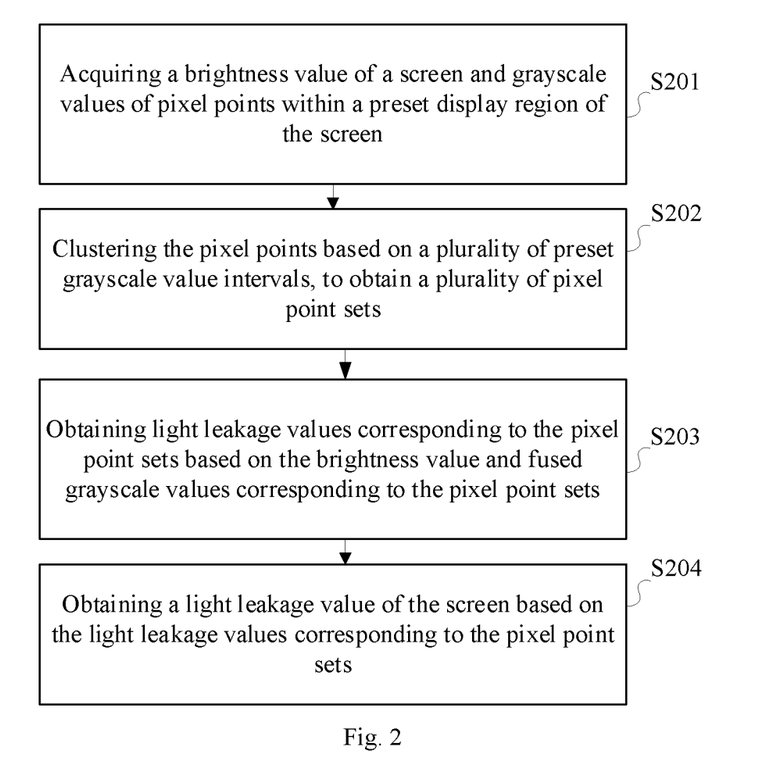
FIG. 2 is a schematic flowchart of a method for detecting light leakage of a screen provided in an embodiment of the present disclosure.

Referring to FIG. 2, FIG. 2 is a schematic flowchart of a method for detecting light leakage of a screen provided in an embodiment of the present disclosure. The method may be executed by the electronic device shown in FIG. 1. The leakage light of the screen refers to light that is emitted by the screen itself, and is emitted from the back of the screen. As shown in FIG. 2, the method includes:

S201: acquiring a brightness value of the screen and grayscale values of pixel points within a preset display region of the screen.

The brightness value of the screen refers to a brightness value of a content displayed on the screen. In a specific implementation, the electronic device may read the brightness value of the screen from an operating system of the electronic device through a corresponding interface.

The grayscale values of the pixel points within the preset display region of the screen refer to grayscale values of pixel points of a content displayed within the preset display region. When the displayed content is a multi-channel image, the grayscale value of each pixel point may include a grayscale value of each color component of each pixel point. When the displayed content is, e.g., a RGB image, the grayscale value of each pixel point may include a grayscale value of a red channel R, a grayscale value of a green channel G, and a grayscale value of a blue channel B of each pixel point. In a specific implementation, the electronic device may capture the display content within the preset display region on the screen using screenshot software, to obtain the grayscale values of the pixel points within the preset display region.

In the present embodiment, selection of the preset display region is associated with a position of a light sensor provided below the screen. Generally, the center of the light sensor receives a strongest light signal, and makes greatest contribution to the light leakage of the screen. The farther the preset display region deviates from the center of the light sensor, the weaker the light signal received by the light sensor is, and the less the preset display region makes contribution to the light leakage of the screen.

Using this feature, in an implementation of the present disclosure, the preset display region is a light detection region of the light sensor provided below the screen. The light detection region of the light sensor is a screen region above the light sensor. The screen region above the light sensor is selected for use as the preset display region, thereby determining a light leakage value of the screen by making full use of grayscale values of pixel points within a region on the screen making great contribution to the light leakage, and then more accurately determining the light leakage value of the screen whilst reducing the computing workload in the subsequent process.

It should be understood that, in the present embodiment, the preset display region may also be other regions on the screen including at least a part of the light detection region above the light sensor. This is not limited in the embodiments of the present disclosure.

S202: clustering the pixel points based on a plurality of preset grayscale value intervals and the grayscale values of the pixel points, to obtain a plurality of pixel point sets.

Grayscale values of pixel points in a same pixel point set are in the same grayscale value interval. The same grayscale value interval may also be referred to as the same color level, and accordingly, pixel point set corresponding to the same grayscale value interval may be referred to as the same color block.

The plurality of preset grayscale value intervals may be divided by the following approach: a grayscale value range of pixel points may be divided into P segments based on a preset step size, to obtain P grayscale value intervals (hereinafter also referred to as P color levels), where P is an integer and P is greater than or equal to 2. The grayscale value range of the pixel points is, e.g., [0, 255] and the preset step size is, e.g., 32, the grayscale value range may be divided into 8 segments [0, 31], [32,63], . . . , [224, 255], i.e., 8 grayscale value intervals are obtained. When a content displayed on the screen is a multi-channel image, e.g., a RGB image, for example, the grayscale value range [0, 255] of a red channel R, a green channel G, and a blue channel B may be divided into 8 segments respectively in accordance with the preset step size 32. Thus, the grayscale value range of the RGB image is divided into 8*8*8 grayscale value intervals, i.e., the total number of color combinations of the RGB image are compressed from 255*255*255 to 8*8*8.

It should be understood that the above grayscale value range may also be determined in accordance with other rules. This is not limited in the present embodiment. In addition, it should be understood that the number of grayscale value intervals obtained by the above division is only an example. In other embodiments, the grayscale value range may be divided into more or less grayscale value intervals as required. The smaller the number of divided grayscale value intervals is, the smaller the number of pixel point sets obtained when clustering the pixel points based on the plurality of preset grayscale value intervals is, and the less the time is spent in subsequently computing the light leakage value in the unit of the pixel point set, i.e., thereby saving time costs to a greater extent. However, the accuracy of light leakage detection may be reduced to some extent. On the contrary, the larger the number of divided grayscale value intervals is, the more the time is spent in subsequently computing the light leakage value in the unit of the pixel point set, thereby failing to contribute to saving time costs. However, the accuracy of light leakage detection may be improved. Therefore, the number of the grayscale value intervals divided from the grayscale value range may be determined based on balance between the detection speed and the detection accuracy of the light leakage detection.

After the grayscale value intervals are obtained by the division, the grayscale value intervals may be stored in an internal or external memory of the electronic device, for use in clustering the pixel points based on the grayscale value intervals.

In the present embodiment, pixel points with grayscale values in a given grayscale value interval may be clustered using any suitable clustering algorithm into a pixel point set corresponding to the grayscale value interval. In an implementation, the clustering the pixel points based on the plurality of preset grayscale value intervals to obtain the plurality of pixel point sets may include: acquiring a preset mapping relationship between the grayscale value intervals and the pixel point sets; and dividing the pixel points into the plurality of pixel point sets based on the mapping relationship and the grayscale values of the pixel points.

The preset mapping relationship includes a one-to-one corresponding relationship between the plurality of grayscale value intervals and the plurality of pixel point sets.

Specifically, each pixel point of the content displayed within the preset display region may be traversed, and when the grayscale value of the pixel point falls into a grayscale value interval, the pixel point may be divided into a pixel point set corresponding to the grayscale value interval. For example, the grayscale value range of the above RGB image is still divided into 512 grayscale value intervals. For example, for a first pixel point with a grayscale value of (r=10, g=2, b=31) and a second pixel point with a grayscale value of (r=0, g=16, b=0), since three channel values of r, g, and b of the first pixel point and the second pixel point are all in a grayscale value interval [0, 31], the first pixel point and the second pixel point are mapped to the 1st pixel point set. For another example, for a third pixel point with a grayscale value of (r=244, g=244, b=244) and a fourth pixel point with a grayscale value of (r=255, g=255, b=255), since three channel values of r, g, and b of the third pixel point and the fourth pixel point are all in a grayscale value range [224, 255], the third pixel point and the fourth pixel point are mapped to the 512th pixel point set. In this way, the pixel points of the content displayed within the preset display region may be divided into a plurality of pixel point sets. Since there is one-to-one correspondence between the pixel point sets and the grayscale value intervals, the maximum number of computations is only 512 when the light leakage value is subsequently computed in the unit of the pixel point set. Compared with the number of computations of 255*255*255 in the unit of the pixel point, the number of computations is greatly reduced, thereby greatly reducing the time costs of light leakage detection.

It should be understood that since the content displayed within the preset display region may not cover the whole grayscale value range, the number of pixel point sets obtained by clustering the pixel points based on the plurality of preset grayscale value intervals may be less than 512. That is, in a practical application, the maximum number of computations may be less than 512, so that the light leakage detection may be less time-consuming.

Specifically, an actual number of pixel point sets obtained by clustering pixel points of different display contents is associated with color complexity of the display contents. Based on the preset grayscale value intervals, if the display content is a solid color image, all pixel points will be divided into the same pixel point set. Therefore, when the light leakage value is subsequently computed in unit of the pixel point set, computation is required only once, such that the time consumption for light leakage detection is minimized. If a RGB value of the display content is distributed in a broad range, the number of computations increases accordingly, and the time consumption for light leakage detection also increases accordingly. Therefore, the method for detecting light leakage of a screen provided in the present embodiment may adaptively adjust the number of computations based on the color complexity of the screen display content.

S203: obtaining light leakage values corresponding to the pixel point sets based on the brightness value and fused grayscale values corresponding to the pixel point sets.

Each of the fused grayscale values is obtained by fusing the grayscale values of the pixel points in the pixel point set corresponding to the fused grayscale value.

In an implementation, for each pixel point set, a fused grayscale value of the pixel point set may be determined based on a mean value of the grayscale values of the pixel points in the pixel point set.

Similarly, when the display content is, e.g., the RGB image, for each pixel point set, grayscale values of the red channel R of the pixel points in the pixel point set may be averaged for use as a fused grayscale value of the red channel R; and similarly, grayscale values of the green channel G of the pixel points in the pixel point set may be averaged for use as a fused grayscale value of the green channel G, and grayscale values of the blue channel B of the pixel points in the pixel point set may be averaged for use as a fused grayscale value of the blue channel B.

It should be understood that, in other implementations, based on a median of grayscale values of pixel points in each pixel point set, a fused grayscale value of the pixel point set may be determined, or based on the grayscale values of the pixel points in each pixel point set, the fused grayscale value of the pixel point set may be determined by other approaches.

In the present embodiment, each pixel point set obtained by clustering in step S202 may be traversed. For each pixel point set, the light leakage value corresponding to the pixel point set is obtained based on the brightness value of the screen and the fused grayscale values corresponding to the pixel point set.

When a content displayed in the preset region is a multi-channel image, the light leakage values corresponding to the pixel point sets may include light leakage values of a plurality of channels corresponding to the pixel point sets. For example, the multi-channel image is, e.g., the RGB image, and in an implementation, the light leakage values corresponding to the pixel point sets may include light leakage values of the red channel R corresponding to the pixel point sets, light leakage values of the green channel G corresponding to the pixel point sets, and light leakage values of the blue channel B corresponding to the pixel point sets. In another implementation, light leakage values corresponding to the pixel points not only includes the light leakage values of the red channel R, the light leakage values of the green channel G, and the light leakage values of the blue channel B, but also may include light leakage values of a Clear channel (hereinafter referred to as channel C) and light leakage values of a Wideband channel (hereinafter referred to as channel W), i.e., the light leakage values corresponding to the pixel points include the light leakage values of the five channels. The light leakage values of the channel C include the light leakage values of three channels RGB, and the light leakage values of the channel W include the light leakage values of four channels RGB and Infrared Radiation (IR).

In an implementation, the obtaining the light leakage values corresponding to the pixel point sets based on the brightness value and the fused grayscale values corresponding to the pixel point sets includes: acquiring a preset corresponding relationship between the grayscale values, the brightness value and the light leakage values; and obtaining, based on the corresponding relationship, the light leakage values corresponding to the pixel point sets according to the brightness value and the fused grayscale values corresponding to the pixel point sets.

The preset corresponding relationship between the grayscale values, the brightness value, and the light leakage values may be pre-stored in an internal or external memory of the electronic device, to facilitate reading by the electronic device from the memory in actual use.

In an alternative implementation, the preset corresponding relationship between the grayscale values, the brightness value, and the light leakage values includes a mapping relationship: light leakage value=f(r, g, b, bright). Based on the mapping relationship, the light leakage values corresponding to the pixel point sets are obtained as f(r, g, b, bright). The r, g, and b are a R channel value, a G channel value, and a B channel value of each pixel point respectively, and the bright is the brightness value of the screen.

In a specific implementation, the electronic device may traverse each pixel point set, and determine the light leakage values corresponding to the fused grayscale values of the pixel point sets and the brightness value of the screen for use as the light leakage values corresponding to the pixel point sets based on the fused grayscale values of the pixel point sets, the brightness value of the screen, and the preset corresponding relationship between the grayscale values, the brightness value, and the light leakage values.

In another implementation, the obtaining the light leakage values corresponding to the pixel point sets based on the brightness value and the fused grayscale values corresponding to the pixel point sets includes: inputting the brightness value and the fused grayscale values corresponding to the pixel point sets into a neural network model, to process the brightness value and the fused grayscale values corresponding to the pixel point sets using the neural network model, to obtain the light leakage values corresponding to the pixel point sets.

Specifically, each pixel point set may be traversed, and a fused grayscale value corresponding to each pixel point set and the brightness value of the screen may be inputted as a group of to-be-processed data into the neural network model, to process the group of to-be-processed data using the neural network model, and predict the light leakage value corresponding to the pixel point set. The neural network model is invoked once based on each pixel point set, such that the number of computations by the neural network model is reduced compared with that when the neural network model is invoked by each pixel point, thereby greatly reducing the time consumption for computing the light leakage of the screen.

In a specific implementation, a deep neural network (DNN) model may be used as the neural network model. The to-be-processed data including the fused grayscale values and the brightness value of the screen have no local features, and in the DNN model structure, lower-layer neurons are connected with all upper-layer neurons, such that the DNN model may be used for favorably extracting a feature association between all features of such type of to-be-processed data.

However, with the deepening of the model layers, the DNN model may have the problem of failure to be trained due to the occurrence of a phenomenon of gradient disappearance. Considering the balance between power consumption and performance when the neural network model is integrated in the electronic device, and in order to improve the fitting accuracy of the neural network model, in another implementation, a residual block structure based on a fully connected unit is used as the neural network model, and is abbreviated as a ResDNN model.

In a specific implementation, the ResDNN model may include a residual module, the residual module includes a plurality of fully connected units, the plurality of fully connected units is sequentially connected in series, a skip connection exists between the plurality of fully connected units, and the skip connection includes a connection between two non-adjacent fully connected units.

In an alternative embodiment, the skip connection is a skip connection between a first fully connected unit and a last fully connected unit among the plurality of fully connected units.

Specifically, each of the fully connected units includes a fully connected layer, batch normalization (BN), and an activation function. The fully connected layer, the batch normalization, and the activation function are sequentially connected. The fully connected layer may be implemented by general matrix multiplication (GEMM). Each neuron in one of the fully connected layers is connected with all neurons in an upper layer. The number of neurons in the fully connected layers may be set by a user based on the factors, such as desired model fitting ability and model operation efficiency. Specifically, the larger the number of neurons is, the higher the complexity of the model is, and the higher the model fitting ability is. However, the operation time of the model is increased, and the operation efficiency will be decreased. In addition, the number of neurons in the fully connected layers may also be obtained in accordance with a neural architecture search algorithm.

In an alternative embodiment, the residual module includes four fully connected units sequentially connected in series: a first fully connected unit, a second fully connected unit, a third fully connected unit, and a fourth fully connected unit. The first fully connected unit is further connected to the fourth fully connected unit by skipping the second fully connected unit and the third fully connected unit in the middle of the path. Or rather, an output terminal of the activation function of the first fully connected unit is directly connected to an output terminal of the BN of the fourth fully connected unit, so that output data of the activation function from the first fully connected unit and output data of the BN from the fourth fully connected unit are added and then inputted into the activation function of the fourth fully connected unit, thus enabling adaptive skipping of some levels in the neural network model during model training, adaptive adjustment of learning depth, and improvement of the model fitting ability. Located between the fully connected layer and an excitation function, the BN is used for batch normalization of the output results of the fully connected layers, to make the mean value thereof approach 0 and the standard deviation thereof approach 1, and guarantee that inputs of the activation function have stable distribution.

The activation function is connected to the BN for increasing the nonlinearity of the neural network model, so that the neural network model can approximate any nonlinear function. In the embodiment of the present disclosure, a Relu function may be used as the activation function.

In an alternative embodiment, the ResDNN model includes a first fully connected module, a second fully connected module, and the residual module between the first fully connected module and the second fully connected module; the number of the residual modules is plural; and the plurality of residual modules is cascade-connected and is located between the first fully connected module and the second fully connected module.

The first fully connected module may be connected to an input layer of the neural network model. The input layer is used for receiving the to-be-processed data; and the second fully connected module may be connected to an output layer of the neural network model, where the output layer is used for outputting predication data.

The number of residual modules may be set based on the factors, such as desired model fitting ability and model operation efficiency. In a specific implementation of the present disclosure, the number of residual modules is four. It should be understood that in other implementations, the number of residual modules may be more than four, or may be less than four. This is not limited in the present embodiment.

Referring to a classical Resnet model, the ResDNN model uses a skip connection between non-adjacent fully connected units, which enables adaptive skipping of some levels in the model during training, adaptive adjustment of learning depth, and avoidance of difficult training situations, such as gradient disappearance caused by large depth, thereby deepening the model level, and making the trained model have better fitting ability.

S204: obtaining a light leakage value of the screen based on the light leakage values corresponding to the pixel point sets.

The light leakage value of the screen is used for indicating a light intensity of leakage light when the screen is in a current display state. The current display state may be understood as a display state of the screen in use.

Specifically, the light leakage value of the screen may be obtained by fusing the light leakage values corresponding to the pixel point sets. When each light leakage value includes light leakage values of the plurality of channels, in an implementation, light leakage values of each channel among the light leakage values corresponding to the pixel point sets may be fused respectively, to obtain the light leakage value of the screen; and in another implementation, light leakage values of a certain channel (for example, the green channel G) among the light leakage values corresponding to the pixel point sets may be fused only, to obtain the light leakage value of the screen. This is not limited in the present embodiment.

In the embodiment of the present disclosure, because grayscale values of pixel points in a given pixel point set are in the same grayscale value interval (i.e., pixel points in a given grayscale value interval are clustered into the same pixel point set), the light leakage value computation is executed once for each pixel point set, thereby greatly reducing the number of computations, further greatly reducing the power consumption and time costs when detecting the light leakage of the screen by the electronic device, and satisfying the requirements for application of the electronic device, compared with related technologies by which the light leakage value computation is executed once for each pixel point.

Considering that distances between regions on the screen and the center of the light sensor provided below the screen are different, the regions make different contribution to the light leakage of the screen. Specifically, the closer the regions are to the center of the light sensor, the greater the regions make contribution to the light leakage of the screen. Otherwise, the farther the regions are from the center of the light sensor, the less the regions make contribution to the light leakage of the screen. When the light leakage value of the screen is computed, the light leakage weight values of the pixel points in different regions are considered to improve the accuracy of light leakage detection of the screen.

Figure 3:
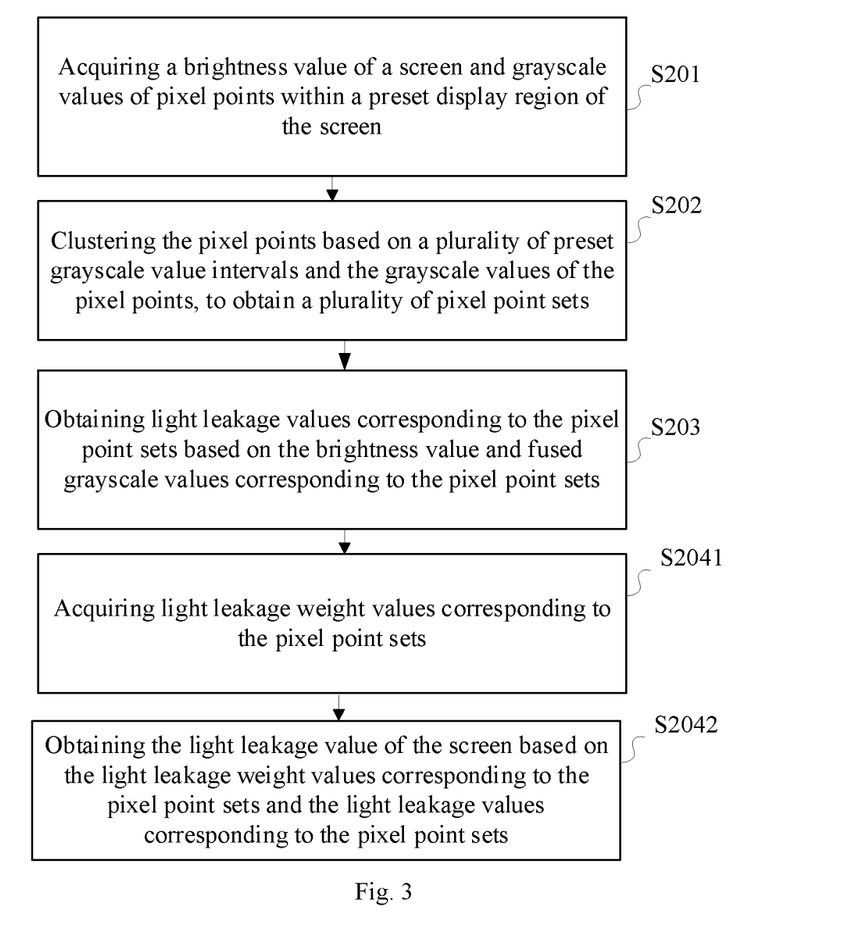
FIG. 3 is a schematic flowchart of another method for detecting light leakage of a screen provided in an embodiment of the present disclosure.

Therefore, in an embodiment of the present disclosure, referring to FIG. 3, step S204 further includes:

S2041: acquiring light leakage weight values corresponding to the pixel point sets.

In an implementation, step S2041 specifically includes:

A: acquiring light leakage weight values corresponding to the pixel points in the pixel point sets.

A light leakage weight value of each pixel point is associated with a relative position between the pixel point and the light sensor provided below the screen.

B: fusing, for each pixel point set, light leakage weight values corresponding to pixel points in the pixel point set, to obtain the light leakage weight value corresponding to the pixel point set.

As mentioned above, the regions on the screen make different contribution to the light leakage of the screen. Therefore, the electronic device may pre-store values of contribution of the regions to the light leakage of the screen, i.e., pre-store light leakage weight values corresponding to the regions.

The light leakage weight values corresponding to the pixel points may be determined based on a light leakage weight value corresponding to an original region (also known as a block) where the pixel points are located before being clustered and the number of pixel points included in the original region.

Figure 4:
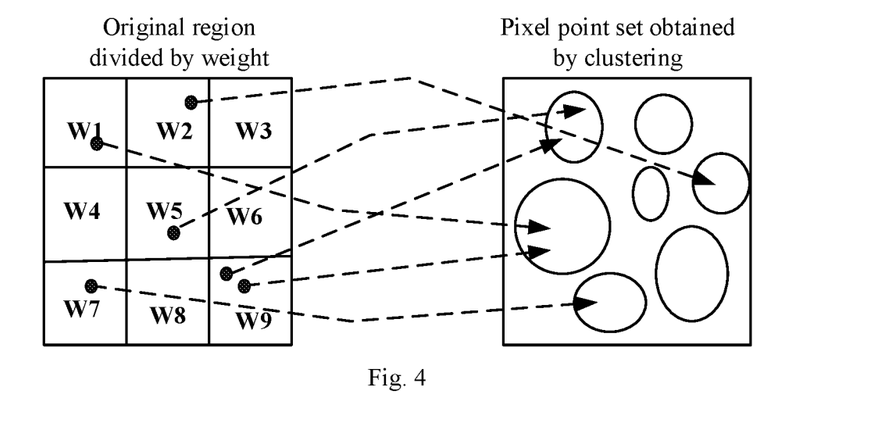
FIG. 4 is a schematic diagram of clustering pixel points provided in an embodiment of the present disclosure.

When the pixel points are clustered based on the plurality of grayscale value intervals, each pixel point carries not only grayscale value information, but also light leakage weight value information corresponding to the pixel point. Each pixel point of, e.g., the RGB image, carries four-dimensional information (r, g, b, w), where w is a light leakage weight value corresponding to the pixel point. As shown in FIG. 4, FIG. 4 is a schematic diagram of clustering pixel points provided in an embodiment of the present disclosure. An original region where the pixel points are located is divided based on positions relationship between regions and the center of a light sensor. Each original region has corresponding light leakage weight information. The dotted line shows that some pixel points in each original region are clustered into corresponding pixel point sets based on the plurality of grayscale value intervals, and the light leakage weight values of the pixel points are mapped to the pixel point sets accordingly.

After the light leakage weight values corresponding to the pixel points are acquired, for each pixel point set, the light leakage weight values corresponding to the pixel points in the pixel point set may be summed, to obtain the light leakage weight value corresponding to the pixel point set.

Specifically, assuming that a light leakage weight value corresponding to an original region where an i-th pixel point in a pixel point set is located is Wi, and the number of pixel points included in the original region is N, a light leakage weight value corresponding to the i-th pixel point is Wi/N. When the number of pixel points included in the pixel point set is n, a light leakage weight value of the pixel point set may be obtained in accordance with equation (1), and the light leakage weight value of the pixel point set may be denoted as weight. The equation (1) is:

$$\text{weight} = \frac{\sum_{i=1}^{n} Wi}{N} \quad (1)$$

S2042: obtaining the light leakage value of the screen based on the light leakage weight values corresponding to the pixel point sets and the light leakage values corresponding to the pixel point sets.

In an implementation, weighted summation may be performed based on the light leakage weight values corresponding to the pixel point sets and the light leakage values corresponding to the pixel point sets, to obtain the light leakage value of the screen.

Assuming that m pixel point sets are clustered, a light leakage value corresponding to each pixel point set is obtained as f(r, g, b, bright) in accordance with step S203, and then the light leakage value of the screen may be obtained in accordance with equation (2). The equation (2) is:

$$leakDN = \sum_{j=1}^{m} f(r, g, b, \text{bright}) * \frac{\sum_{i=1}^{n} Wi}{N} \quad (2)$$

leakDN is the light leakage value of the screen, f(r, g, b, bright) is the preset corresponding relationship between the grayscale value, the brightness value, and the light leakage value, r, g, and b are the R channel value, the G channel value, and the B channel value of each pixel point respectively, bright is the brightness value of the screen, m is the number of pixel point sets, Wi is a light leakage weight value of a block where an i-th pixel point in a j-th pixel point set is located, N is the number of pixel points included in each block, and n is the number of pixel points included in the j-th pixel point set.

In the embodiment of the present disclosure, considering the contribution of each pixel point to the light leakage of the screen, when the light leakage of the screen is computed, the light leakage weight values of the pixel point sets are determined based on the light leakage weight values corresponding to the pixel points, and then the light leakage value of the screen is obtained based on the light leakage weight values corresponding to the pixel point sets and the light leakage values corresponding to the pixel point sets. When the light leakage of the screen is computed, the light leakage weight values of the pixel points are considered to improve the accuracy of light leakage detection of the screen.

It should be noted that, in the above embodiments, the concept of the present disclosure is described mainly based on the display parameters including, e.g., a brightness value and a grayscale value of the screen. It should be understood that, as mentioned above, the factors that affect the light leakage of the screen further include, e.g., the refresh rate of the screen, the display mode of the screen, and/or other display parameters associated with the light leakage of the screen. The light leakage value is computed based on a plurality of factors, thereby contributing to further improving the accuracy of light leakage detection. The working principle when the display parameters further include the refresh rate of the screen, the display mode of the screen, and/or other display parameters associated with the light leakage of the screen is similar to the working principle in the above embodiments. The description will not be repeated here.

Figure 5:
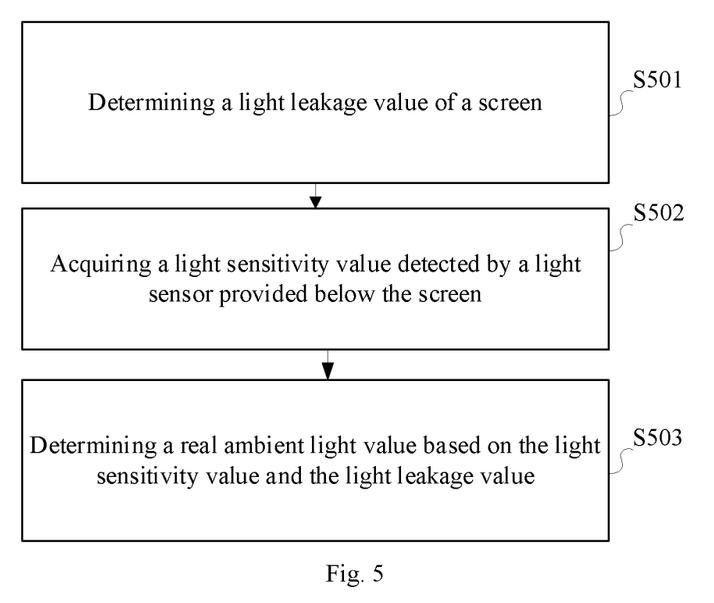
FIG. 5 is a schematic flowchart of a method for detecting ambient light provided in an embodiment of the present disclosure.

Referring to FIG. 5, an embodiment of the present disclosure further provides a method for detecting ambient light. The method is used for determining a practical ambient light value based on the light leakage value of the screen detected in the above embodiments. The method for detecting ambient light provided in an embodiment of the present disclosure is specifically illustrated below with reference to FIG. 5. As shown in FIG. 5, the method includes:

Step S501: determining a light leakage value of a screen based on the method for detecting light leakage of a screen according to any one of the above embodiments.

That is, an electronic device may obtain the light leakage value of the screen by detection using the method for detecting light leakage of a screen mentioned in any one of the above embodiments.

Step S502: acquiring a light sensitivity value detected by a light sensor provided below the screen.

Step S503: determining a real ambient light value based on the light sensitivity value and the light leakage value.

Specifically, the electronic device may obtain the real ambient light value based on a difference between the light sensitivity value and the light leakage value. The electronic device may adjust brightness of the screen based on the real ambient light value, such that the brightness of the screen conforms to visual perception of human eyes. In addition, the electronic device may further adjust color temperatures based on the real ambient light value, to assist in display and photographing.

In the embodiment of the present disclosure, because grayscale values of pixel points in a given pixel point set are in the same grayscale value interval (i.e., pixel points in a given grayscale value interval are clustered into the same pixel point set), the light leakage value computation is executed once for each pixel point set, thereby greatly reducing the number of computations, and further greatly reducing the power consumption and time costs when detecting the light leakage of the screen by the electronic device, compared with related technologies by which the light leakage value computation is executed once for each pixel point. As the speed of light leakage detection of the screen is improved, the real ambient light value can be quickly determined based on the light sensitivity value outputted from the light sensor and the detected light leakage value, which is adapted to scenarios with complex display contents such as dynamic switching and video playing, and meets the application requirements of the electronic device.

Figure 6:
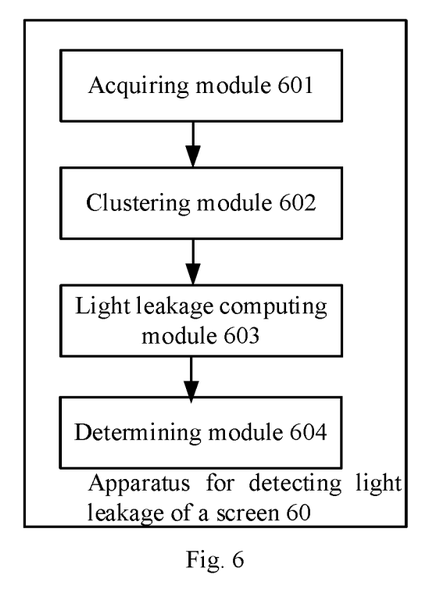
FIG. 6 is a schematic structural diagram of an apparatus for detecting light leakage of a screen provided in an embodiment of the present disclosure.

Referring to FIG. 6, a schematic structural diagram of an apparatus for detecting light leakage of a screen according to an embodiment of the present disclosure is shown. As shown in FIG. 6, the apparatus 60 for detecting light leakage of a screen includes:

an acquiring module 601 configured to acquire a brightness value of the screen and grayscale values of pixel points within a preset display region of the screen;

a clustering module 602 configured to cluster the pixel points based on a plurality of preset grayscale value intervals and the grayscale values of the pixel points, to obtain a plurality of pixel point sets, where pixel points with grayscale values in a given grayscale value interval are clustered into the same pixel point set;

a light leakage computing module 603 configured to obtain light leakage values corresponding to the pixel point sets based on the brightness value and fused grayscale values corresponding to the pixel point sets, where each of the fused grayscale values is obtained by fusing the grayscale values of the pixel points in the corresponding pixel point sets; and a determining module 604 configured to obtain a light leakage value of the screen based on the light leakage values corresponding to the pixel point sets.

In an implementation of the present disclosure, the determining module 604 is specifically configured to:

acquire light leakage weight values corresponding to the pixel point sets; and perform weighted summation on the light leakage weight values corresponding to the pixel point sets and the light leakage values corresponding to the pixel point sets, to obtain the light leakage value of the screen.

In an implementation of the present disclosure, the determining module 604 is specifically configured to:

acquire light leakage weight values corresponding to pixel points in the pixel point sets, where the light leakage weight values of the respective pixel points depend on relative positions between the pixel points and a light sensor provided below the screen; and fuse, for each of the pixel point sets, light leakage weight values corresponding to pixel points in the pixel point set, to obtain a light leakage weight value corresponding to the pixel point set.

In an implementation of the present disclosure, the determining module 604 is specifically configured to:

compute the light leakage weight value corresponding to each pixel point set in accordance with the equation:

$$\text{weight} = \frac{\sum_{i=1}^{n} W_i}{N}$$

where weight is the light leakage weight value corresponding to the pixel point set, $W_i$ is a light leakage weight value of a block where an i-th pixel point in the pixel point set is located, N is the number of pixel points included in each block, and n is the number of pixel points included in the pixel point set.

In an implementation of the present disclosure, the light leakage computing module 603 is specifically configured to:

acquire a preset corresponding relationship between the grayscale values, the brightness value, and the light leakage values; and obtain, based on the corresponding relationship, the light leakage values corresponding to the pixel point sets according to the brightness value, and the fused grayscale values corresponding to the pixel point sets.

In an implementation of the present disclosure, the light leakage computing module 603 is specifically configured to:

input the brightness value and the fused grayscale value corresponding to each of the pixel point sets into a neural network model, to process the brightness value and the fused grayscale value corresponding to the each of the pixel point sets using the neural network model, to obtain the light leakage values corresponding to the each of the pixel point sets.

In an implementation of the present disclosure, the neural network model includes a residual module, the residual module includes a plurality of fully connected units, the plurality of fully connected units is sequentially connected in series, a skip connection exists between the plurality of fully connected units, and the skip connection includes a connection between two non-adjacent fully connected units.

In an implementation of the present disclosure, the skip connection is a skip connection between a first fully connected unit and a last fully connected unit among the plurality of fully connected units.

In an implementation of the present disclosure, the number of the residual modules is plural, the neural network model further includes a first fully connected module and a second fully connected module, and the plurality of residual modules is cascade-connected and is located between the first fully connected module and the second fully connected module.

In an implementation of the present disclosure, the preset display region is a light detection region of the screen, and the light detection region corresponds to a position of a light sensor provided below the screen.

In an implementation of the present disclosure, the clustering module 602 is specifically configured to:

acquire a preset mapping relationship between the grayscale value intervals and the pixel point sets; and divide the pixel points into the plurality of pixel point sets based on the preset mapping relationship and the grayscale values of the pixel points.

The apparatus 60 for detecting light leakage of a screen provided in the present embodiment is configured to implement the method for detecting light leakage of a screen according to the above embodiments, and has the beneficial effects of the corresponding method embodiments. The description will not be repeated here.

Figure 7:
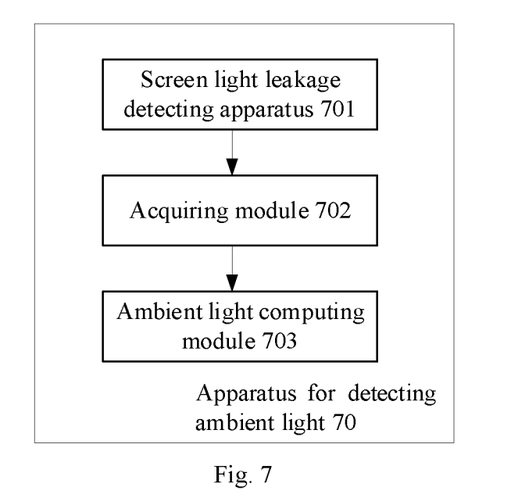
FIG. 7 is a schematic structural diagram of an apparatus for detecting ambient light provided in an embodiment of the present disclosure.

Referring to FIG. 7, a schematic structural diagram of an apparatus for detecting ambient light according to an embodiment of the present disclosure is shown. As shown in FIG. 7, the apparatus 70 for detecting ambient light includes:

a screen light leakage detecting apparatus 701 configured to determine a light leakage value of a screen, where the screen light leakage detecting apparatus 701 is the apparatus 60 for detecting light leakage of a screen according to the third aspect, specifically referring to the apparatus 60 for detecting light leakage of a screen in the third aspect for the functions and effects thereof, and the description will not be repeated here;

an acquiring module 702 configured to acquire a light sensitivity value detected by a light sensor provided below the screen; and an ambient light computing module 703 configured to determine a real ambient light value based on the light sensitivity value and the light leakage value.

The apparatus 90 for detecting ambient light provided in the pre sent embodiment is configured to implement the method for detecting ambient light in the above embodiments, and has the beneficial effects of the corresponding method embodiments. The description will not be repeated here.

Figure 8:
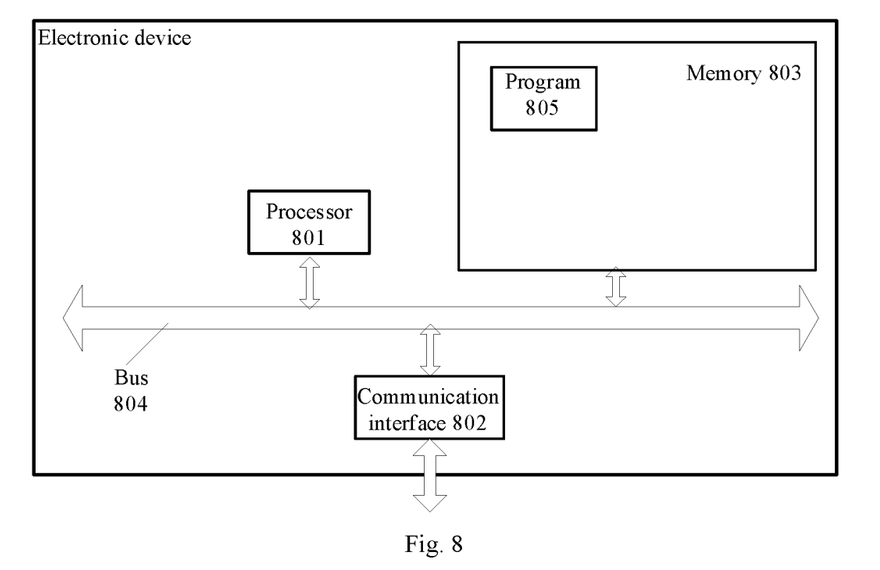
FIG. 8 is a schematic structural diagram of an electronic device provided in an embodiment of the present disclosure.

Referring to FIG. 8, a schematic structural diagram of an electronic device according to an embodiment of the present disclosure is shown. Specific embodiments of the present disclosure do not impose any limitation on specific implementations of the electronic device.

As shown in FIG. 8, the electronic device may include: a processor 801, a communication interface 802, a memory 803, and a communication bus 804.

The processor 801, the communication interface 802, and the memory 803 complete communication with each other through the communication bus 804.

The communication interface 802 is configured to communicate with other electronic devices or servers.

The processor 801 is configured to execute a program 805, and specifically may execute relevant steps of the method for detecting light leakage of a screen and/or the method for detecting ambient light according to the above method embodiments.

Specifically, the program 805 may include a program code. The program code includes computer operation instructions.

The processor may be a central processing unit, or an application specific integrated circuit, or one or more integrated circuits configured to implement the embodiments of the present disclosure. One or more processors included in a smart device may be processors of a given type, e.g., one or more CPUs; or may be processors of different types, e.g., one or more CPUs and one or more ASICs.

The memory is configured to store the program. The memory may include a high-speed RAM memory, and may further include a non-volatile memory, e.g., at least one disk memory. The program may be specifically used for making the processor execute relevant steps of the method for detecting light leakage of a screen and/or the method for detecting ambient light according to the above method embodiments. Corresponding description of the corresponding steps and units in the above method embodiments may be referred to for specific implementations of the steps. The description will not be repeated here.

The electronic device in the present embodiment is configured to implement the corresponding methods in the above method embodiments, and has the beneficial effects of the corresponding method embodiments. The description will not be repeated here. The electronic device may be, for example, a portable or mobile computing device, such as a smart phone, a notebook computer, a tablet computer, or a game device, or may be other electronic devices, such as an electronic database, an automobile, or an automated teller machine (ATM) of a bank. This is not limited in the embodiments of the present disclosure.

The embodiment of the present disclosure provides a computer readable storage medium storing a computer program thereon, where the computer program, when executed by a processor, implements the method for detecting light leakage of a screen provided in the above method embodiments and/or the method for detecting ambient light provided in the above method embodiments. It has similar working principle and technical effects. The description will not be repeated here.

It should be noted that, depending on the implementation requirements, the components/steps described in the embodiments of the present disclosure may be split into more components/steps, or two or more components/steps or partial operations of the components/steps may be combined into novel components/steps to achieve the goal of the embodiments of the present disclosure.

The above method according to the embodiments of the present disclosure may be implemented in hardware or firmware, or be implemented as software or computer code storable in a recording medium (such as a CD ROM, RAM, floppy disk, hard disk, or magnetic disk), or be implemented as computer code that is downloaded from a network, is originally stored in a remote recording medium or a non-transitory machine-readable medium, and will be stored in a local recording medium, such that the method described herein may be processed by such software stored on a recording medium using a general-purpose computer, a special-purpose processor, or programmable or dedicated hardware (such as an ASIC or FPGA). It is understandable that a computer, a processor, a microprocessor controller, or programmable hardware includes a storage component (e.g., RAM, ROM, or flash memory) that can store or receive software or computer code. The method for generating a check code described herein is implemented when the software or computer code is accessed and executed by the computer, the processor, or the hardware. Further, when a general-purpose computer accesses the code for implementing the method for generating a check code shown herein, the execution of the code converts the general-purpose computer into a special-purpose computer configured to execute the method for generating a check code shown herein.

As will be appreciated by those of ordinary skills in the art, the various example units and method steps described in combination with the embodiments disclosed herein can be implemented by electronic hardware, or a combination of computer software and electronic hardware. Whether these functions are executed by hardware or software depends on specific applications and design constraints of the technical solutions. Those skilled in the art may implement described functions for each specific application using different methods, but such implementation should not be considered as falling beyond the scope of the embodiments of the present disclosure.

The above embodiments are only used to illustrate the embodiments of the present disclosure, and are not intended to limit the embodiments of the present disclosure. Those of ordinary skills in the relevant technical field may further make various alterations and modifications without departing from the spirit and scope of the embodiments of the present disclosure. Therefore, all equivalent technical solutions are also encompassed within the scope of the embodiments of the present disclosure, and the scope of patent protection of the embodiments of the present disclosure should be defined by the appended claims.

What is claimed is:

1. A method for detecting light leakage of a screen, comprising:
    acquiring a brightness value of the screen and grayscale values of pixel points within a preset display region of the screen;
    clustering the pixel points based on a plurality of preset grayscale value intervals and the grayscale values of the pixel points, to obtain a plurality of pixel point sets, wherein grayscale values of pixel points in a same pixel point set are in a same grayscale value interval;
    obtaining light leakage values corresponding to the pixel point sets based on the brightness value and fused grayscale values corresponding to the pixel point sets, wherein each of the fused grayscale values is obtained by fusing the grayscale values of the pixel points in the pixel point set corresponding to the fused grayscale value; and
    obtaining a light leakage value of the screen based on the light leakage values corresponding to the pixel point sets.

2. The detection method according to claim 1, wherein the obtaining the light leakage value of the screen based on the light leakage values corresponding to the pixel point sets comprises:
    acquiring light leakage weight values corresponding to the pixel point sets; and
    performing weighted summation on the light leakage weight values corresponding to the pixel point sets and the light leakage values corresponding to the pixel point sets, to obtain the light leakage value of the screen.

3. The detection method according to claim 2, wherein the acquiring the light leakage weight values corresponding to the pixel point sets comprises:
    acquiring light leakage weight values corresponding to the pixel points in the pixel point sets, wherein the light leakage weight values corresponding to the pixel points depend on relative positions between the pixel points and a light sensor provided below the screen; and fusing, for each of the pixel point sets, light leakage weight values corresponding to pixel points in the pixel point set, to obtain the light leakage weight value corresponding to the pixel point set.

4. The detection method according to claim 2, wherein the acquiring the light leakage weight values corresponding to the pixel point sets comprises:

computing a light leakage weight value corresponding to each of the pixel point sets in accordance with a equation:

$$\text{weight} = \frac{\sum_{i=1}^{n} Wi}{N}$$

wherein weight is the light leakage weight value corresponding to the pixel point set, Wi is a light leakage weight value of a block where an i-th pixel point in the pixel point set is located, N is a number of pixel points included in each block, and n is a number of pixel points included in the pixel point set.

5. The detection method according to claim 1, wherein the obtaining light leakage values corresponding to the pixel point sets based on the brightness value and the fused grayscale values corresponding to the pixel point sets comprises:

acquiring a preset corresponding relationship between the grayscale values, the brightness value, and the light leakage values; and obtaining, based on the corresponding relationship, the light leakage values corresponding to the pixel point sets according to the brightness value and the fused grayscale values corresponding to the pixel point sets.

6. The detection method according to claim 1, wherein the obtaining light leakage values corresponding to the pixel point sets based on the brightness value and the fused grayscale values corresponding to the pixel point sets comprises:

inputting the brightness value and the fused grayscale value corresponding to each of the pixel point sets into a neural network model, to process the brightness value and the fused grayscale value corresponding to the each of the pixel point sets using the neural network model, to obtain the light leakage value corresponding to the each of the pixel point sets.

7. The detection method according to claim 6, wherein the neural network model comprises a residual module, wherein the residual module comprises a plurality of fully connected units, the plurality of fully connected units is sequentially connected in series, a skip connection exists between the plurality of fully connected units, and the skip connection comprises a connection between two non-adjacent fully connected units.

8. The detection method according to claim 7, wherein the skip connection is a skip connection between a first fully connected unit and a last fully connected unit among the plurality of fully connected units.

9. The detection method according to claim 7, wherein a number of the residual modules is plural, the neural network model further comprises a first fully connected module and a second fully connected module, and the plurality of residual modules is cascade-connected and is located between the first fully connected module and the second fully connected module.

10. The detection method according to claim 1, wherein the preset display region is a light detection region of the screen, and the light detection region corresponds to a position of a light sensor provided below the screen.

11. The detection method according to claim 1, wherein the clustering the pixel points based on the plurality of preset grayscale value intervals and the grayscale values of the pixel points, to obtain the plurality of pixel point sets, comprises:

acquiring a preset mapping relationship between the grayscale value intervals and the pixel point sets; and dividing the pixel points into the plurality of pixel point sets based on the preset mapping relationship and the grayscale values of the pixel points.

12. A method for detecting ambient light, comprising:

determining a light leakage value of a screen based on the method for detecting light leakage of a screen according to claim 1;

acquiring a light sensitivity value detected by a light sensor provided below the screen; and determining an ambient light value based on the light sensitivity value and the light leakage value.

13. An apparatus for detecting ambient light, comprising:

a screen light leakage detecting apparatus configured to determine a light leakage value of a screen, wherein the screen light leakage detecting apparatus comprises:

an acquiring module configured to acquire a brightness value of the screen and grayscale values of pixel points within a preset display region of the screen;

a clustering module configured to cluster the pixel points based on a plurality of preset grayscale value intervals and the grayscale values of the pixel points, to obtain a plurality of pixel point sets, wherein pixel points with grayscale values in a same grayscale value interval are clustered into a same pixel point set;

a light leakage computing module configured to obtain light leakage values corresponding to the pixel point sets based on the brightness value and fused grayscale values corresponding to the pixel point sets, wherein each of the fused grayscale values is obtained by fusing the grayscale values of the pixel points in the pixel point set corresponding to the fused grayscale value; and a determining module configured to obtain a light leakage value of the screen based on the light leakage values corresponding to the pixel point sets;

an acquiring module configured to acquire a light sensitivity value detected by a light sensor provided below the screen; and an ambient light computing module configured to determine an ambient light value based on the light sensitivity value and the light leakage value.

* * * * *